July 13, 1965 R. C. WARD 3,195,045
SYSTEM FOR MEASURING THE RESISTANCE VALUE OF
A RESISTOR IN BINARY DIGITAL FORM
Filed Nov. 4, 1960 2 Sheets-Sheet 1
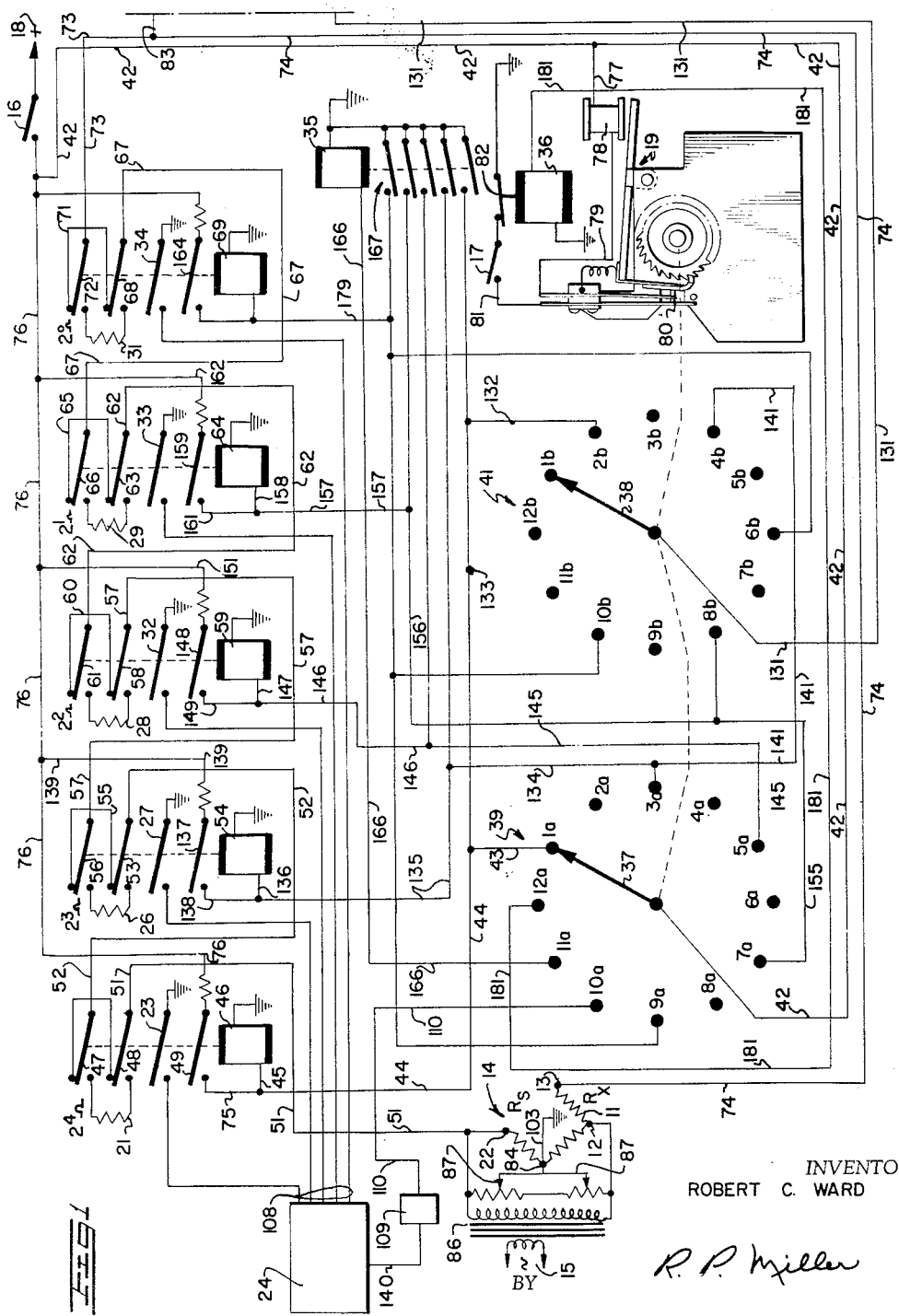
INVENTOR
ROBERT C. WARD
BY R. P. Miller
ATTORNEY

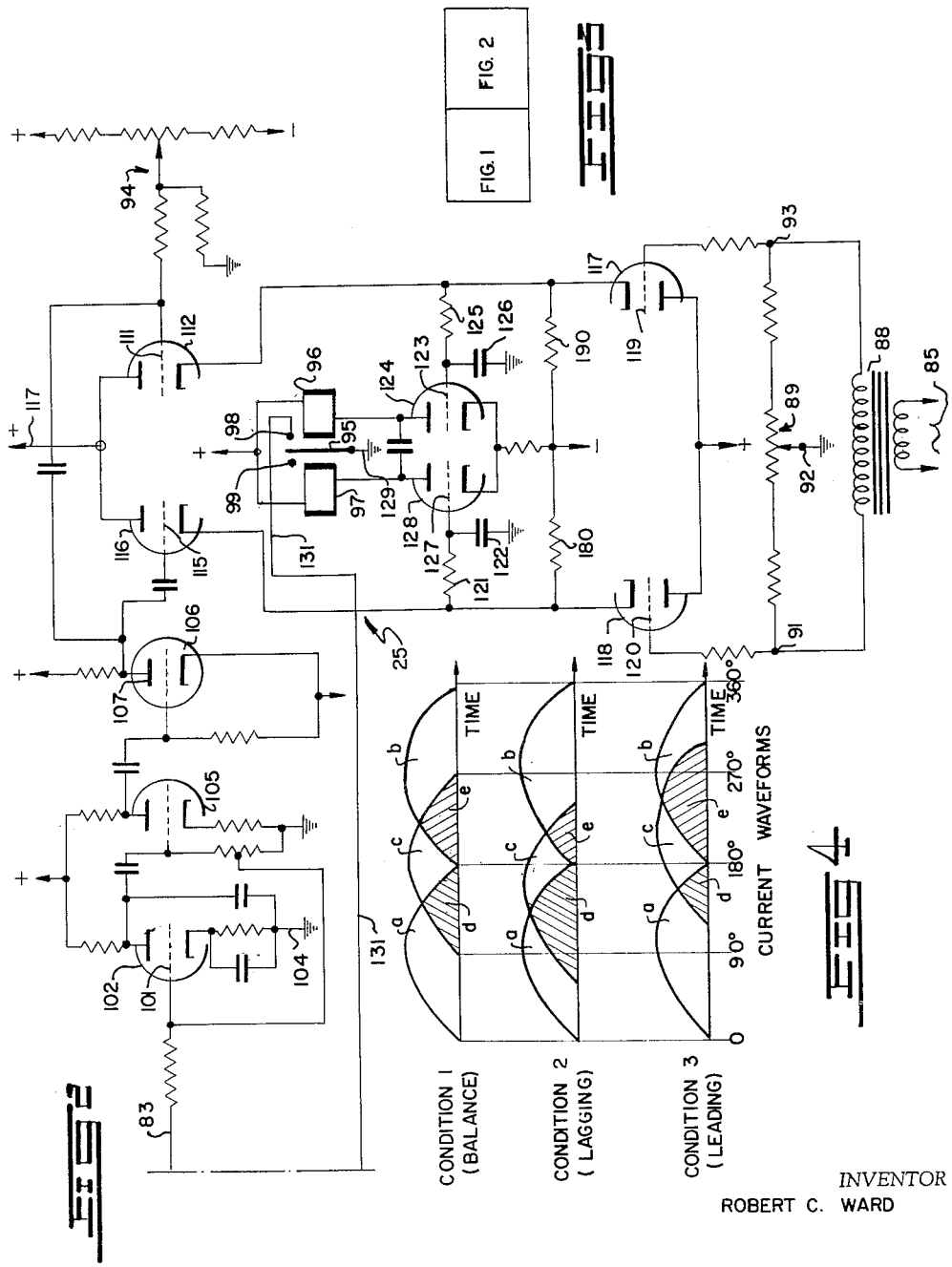

United States Patent Office 3,195,045
Patented July 13, 1965

3,195,045
SYSTEM FOR MEASURING THE RESISTANCE VALUE OF A RESISTOR IN BINARY DIGITAL FORM
Robert C. Ward, Winston-Salem, N.C., assignor to Western Electric Company, Incorporated, a corporation of New York
Filed Nov. 4, 1960, Ser. No. 67,245
1 Claim. (Cl. 324—62)

This invention relates to a system for ascertaining the electrical characteristics of an electrical component, and more particularly to an apparatus for measuring the resistance value of a resistor in a binary digital form suitable for input into a digital computer.

In the manufacture of electrical components it is necessary to ascertain their characteristics to determine whether they meet manufacturing standards. For example, in the manufacture of resistors, it has been customary to measure resistance values by bridges, ohmmeters, and the like. Where mass production methods are employed, it is necessary to perform these measurements with a minimum expenditure of time, preferably automatically. This can be accomplished only by avoiding measuring circuits that require individual adjustments and readings for each measurement performed. Thus, it is apparent that bridge circuits requiring adjustments and meters requiring visual readings are not readily adapted for measuring on a mass production basis. On the other hand, a computer which can "read" bridge circuit measurements and accordingly control a resistor production line readily lends itself to automated mass production. However, equipment which translates resistance values into a form recognizable by the computer is necessary.

Accordingly, it is a primary object of the present invention to provide a relatively simple, accurate, and economical system for ascertaining in a digital form the electrical characteristics of an electrical component.

Another object of the invention resides in a measuring circuit having a binary digital output recognizable by a computer.

An additional object of the invention is the provision of an apparatus for determining the binary equivalent of a resistor to be measured by successively connecting a series of electrical components having characteristics of known values within a comparing circuit having the resistor connected therein, comparing such known components with the resistor to be measured and selectively disconnecting the known components until the comparing circuit balances.

With these and other objects in view, the present invention contemplates a system for ascertaining an electrical characteristic in a binary form of an electrical component having unknown characteristics. The unknown component is connected within a comparing circuit. A series of electrical components having known characteristics of descending magnitude are successively connected within the comparing circuit. After each known component is so connected within the comparing circuit, such known component is compared with the unknown component and disconnected from the comparing circuit if the particular compared and known component has a characteristic larger in magnitude than that of the unknown component. If the particular known component has a characteristic smaller than or equal to that of the unknown component, it is retained in the comparing circuit. Such connecting of known components within the comparing circuit, comparing of known with unknown components, and selectively disconnecting of known components continues until the comparing circuit reaches a balanced state. Associated with each known component is a bi-stable device, which is operated when its associated known component is connected within the comparing circuit. After the comparing circuit is in a balanced state, the condition, either operated or unoperated, of the bi-stable devices indicates the electrical characteristic in binary digital form of the unknown component.

Other objects and advantages of the present invention will be apparent from the following detailed description when considered in conjunction with the accompanying drawings, wherein FIGS. 1 and 2 when assembled in the manner depicted in FIG. 3 illustrate a measuring system, embodying the principles of the invention, for ascertaining an electrical characteristic in a binary form of an electrical component, such as a resistor, having unknown characteristics.

FIG. 4 illustrates current waveforms in the null detector.

A necessary adjunct to automated resistor production with digital computer control is equipment which translates resistance value into a form recognizable by the computer. With most digital computers, computations are carried out in binary form. A great saving of time and increased accuracy are achieved if a resistance value is measured with a device having a binary output and fed directly into the computer.

The "language" used by almost all digital computers is composed of "words" represented by the condition of devices capable of being in one or the other of two stable states, that is, by the condition of bi-stable devices. Examples of such devices are relays, which are either operated or unoperated; electron tubes, transistors, and diode gates, which are either conducting or nonconducting; magnetic cores saturated in one direction or the other; and switches or contacts, which are either closed or open.

In the present invention the output of the measuring system is represented in the binary number system. In this system counting is done by two's instead of by ten's as in the familiar decimal number system. Such counting by two's in the present invention is achieved through the use of a plurality of relays having contacts which are either (1) closed or (2) open when the relays are either (1) energized or (2) deenergized, as will be apparent from a careful reading of the following detailed description of the invention.

Considering first the overall operation of the measuring system, a resistor 11 (left side of FIG. 1) to be measured is manually or automatically inserted between terminal contactors 12 and 13 of a comparing circuit or bridge circuit designated generally by the numeral 14. The bridge circuit is energized by a source of alternating current 15. With the closure of manual switches 16 and 17 (right side of FIG. 1) a positive source of direct current 18 is connected to energize a stepping switch designated generally by the numeral 19. Upon energization of the stepping switch 19, it moves to a first position where a resistor 21 having a known resistance value is connected within the bridge circuit 14 between terminal contactors 13 and 22. Simultaneous with the connection of resistor 21 within bridge circuit 14, contacts 23 close to complete a circuit to a utilization device such as a computer 24. It is apparent that contacts 23 comprise a bi-stable device, that is, a device capable of being in one or the other of two stable states, open or closed.

After known resistor 21 is connected within the bridge 14, stepping switch 19 moves to its second position where the resistance value of the now connected known resistor 21 is compared to the resistance value of unknown resistor 11 by means of a phase-sensitive null detector designated generally by the numeral 25, FIG. 2. Accordingly, if the connected known resistor 21 results in a resistance value that is greater than that of the unknown resistor 11, resistor 21 is disconnected from bridge circuit 14 and previously closed contacts 23 are opened through the co-operation of the phase-sensitive null detector 25 and stepping switch 19. On the other hand if the resistance value of the now connected known resistor 21 is less than or equal to that of the unknown resistor 11, resistor 21 is retained in the bridge circuit 14.

Then, stepping switch 19 moves to its third position where another resistor 26 having a known resistance value smaller than that of known resistor 21 is connected within bridge circuit 14 and contacts 27 are closed. If known resistor 21 has been retained in the bridge circuit 14, known resistor 26 is connected in series with resistor 21, and such series combination is connected between terminal contactors 13 and 22. On the other hand, if known resistor 21 has been disconnected from bridge 14, known resistor 26 is simply connected within bridge circuit 14 between terminal contactors 13 and 22. After known resistor 26 has been connected within bridge circuit 14, stepping switch 19 moves to its fourth position where a comparing or checking operation is again accomplished by the phase-sensitive null detector 25. If known resistor 21 has been retained in the bridge circuit 14, a comparison or check is made to determine whether the serially combined resistance of known resistors 21 and 26 is less than, equal to, or greater than the resistance of the unknown resistor 11. On the other hand if known resistor 21 has been disconnected from bridge circuit 14, the comparison or check is only made to determine whether known resistor 26 is less than, equal to, or greater than the resistance of unknown resistor 11. In accordance with the results of this comparison operation, known resistor 26 is retained if its resistance value in combination with that of known resistor 21 (if this resistor 21 has been retained in bridge 14) is smaller than or equal to the resistance value of unknown resistor 11. If the value of known resistor 26, either alone or in combination with that of known resistor 21 (if this resistor has been retained) is too large, resistor 26 is disconnected and contacts 27 are opened.

Similarly, resistors 28, 29, and 31 of successively smaller known resistance values are successively and sequentially connected within bridge circuit 14 and corresponding contacts 32, 33, and 34 are closed. Also, known resistors 28, 29, and 31 are similarly compared with the unknown resistor 11. In accordance with the results of such comparison, the known resistors 28, 29, and 31 are either retained and the corresponding contacts 32, 33, and 34 left closed, or such known resistors 28, 29, and 31 are disconnected and the corresponding contacts 32, 33, and 34 are opened. This successive and sequential connecting, comparing, and selective disconnecting of known resistors 21, 26, 28, 29, and 31 continues until bridge circuit 14 balances.

Stepping switch 19 continues to move until it reaches its third from last position. At this position the measuring operation for the particular unknown resistor under test is completed and the known resistors 21, 26, 28, 29, and 31 which are retained at this position in bridge circuit 14 represents the binary equivalent of the unknown resistor 11 by means of the condition of the contacts 23, 27, 32, 33, and 34 corresponding to such known resistors. Since the measuring operation has been completed at this position, computer 24 is conditioned to "read" the state of the bridge circuit 14.

The stepping switch 19 then moves to its second from last position where normally open relay 35 is energized to short out known resistors 21, 26, 28, 29, and 31, and open contacts 23, 27, 32, 33, and 34, thereby resetting the measuring circuit in anticipation of another measuring operation. Finally, stepping switch 19 moves to its last position where a normally closed relay 36 is energized to open and deenergize the circuit of stepping switch 19. When another unknown resistor is inserted between terminal contactors 12 and 13 and the stepping switch 19 is moved from its last to its first position, the measuring circuit is conditioned for another measuring cycle. Such insertion of the unknown resistor and such movement of the stepping switch 19 may be either manual or automatic.

Now, to illustrate the operation of the measuring circuit in detail, an example of a resistor to be measured having a resistance value within the range of the measuring circuit of FIGS. 1 and 2 will be considered. Assume, for example, that the unknown resistor 11 has a resistance value of 21 ohms. This resistor is inserted between terminal contactors 12 and 13 of bridge 14. With the unknown resistor 11 so inserted within the bridge 14 and sweep arms 37 and 38, respectively, of switch banks 39 and 41 of stepping switch 19 in positions 1a and 1b, respectively, the measuring circuit is conditioned to initiate a measuring cycle of unknown resistor 11 to determine its resistance value in binary form so as to be recognizable by the computer 24.

To start the measuring operation switches 16 and 17 are closed. By closure of switch 16 the source of direct current 18 is connected through now closed switch 16, conductor 42, sweep arm 37, contactor 1a, conductors 43, 44, and 45, and relay 46 to ground. Completion of this circuit energizes relay 46 to move downwardly contacts 47 and 48, and close contacts 23 and 49. Upon downward movement of contacts 47 and 48 resistor 21 is connected between terminal contactors 13 and 22 of bridge 14. This circuit is traced from: terminal contactor 22, conductor 51, now downwardly moved contacts 48 of operated relay 46, resistor 21, now downwardly moved contacts 47 of operated relay 46, conductor 52, contacts 53 of unoperated relay 54, strap 55, contacts 56 of unoperated relay 54, conductor 57, contacts 58 of unoperated relay 59, strap 60, contacts 61 of unoperated relay 59, conductor 62, contacts 63 of unoperated relay 64, strap 65, contacts 66 of unoperated relay 64, conductor 67, contacts 68 of unoperated relay 69, strap 71, contacts 72 of unoperated relay 69, and conductors 73 and 74 to terminal contactor 13.

Upon operation of relay 46, a holding circuit is established from ground through relay 46, conductors 45 and 75, now closed contacts 49, conductor 76, and closed switch 16 to the source of direct current 18. This holding circuit keeps relay 46 energized or operated until it is subsequently short circuited.

Contacts 23 of relay 46 comprise a bi-stable device, that is, a device capable of being in one or the other of two stable conditions. One of these stable conditions is represented by contacts 23 being opened and the other by contacts 23 being closed. In the binary number system such condition of open contacts is represented by 0 and such condition of closed contacts is represented by 1. Upon energization of relay 46 the condition of contacts 23 changes from opened to closed, that is, from 0 to 1. Such change is subsequently sensed by computer 24.

Moreover upon closure of switches 16 and 17, a circuit is completed from the source of direct current 18 through now closed switch 16, conductors 42 and 77, operating coil 78 of stepping switch 19, conductor 79, contacts 80 of stepping switch 19, conductor 81, now closed switch 17 and normally closed contacts 82 of relays 36 to ground. Completion of this circuit energizes stepping switch 19 to simultaneously move sweep arms 37 and 38, respectively, from contactors 1a and 1b to contactors 2a and 2b. With the sweep arms 37 and 38 in engagement with contactors 2a and 2b the resistance value of known resistor 21 is compared to that of unknown resistor 11. Known resistor 21 is equal to $2^4$ or 16 ohms and is represented in the binary number system as $$1 \times 2^4 + 0 \times 2^3 + 0 \times 2^2 + 0 \times 2^1 + 0 \times 2^0$$

or 1 0 0 0 0. The comparison of known resistor 21 to unknown resistor 11 is accomplished by means of the phase-sensitive null detector 25, FIG. 2, which is coupled to bridge 14 by conductors 83 and 74, terminal contactors 13 and 84, and ground. Since known resistor 21 of 16 ohms is smaller in value than the unknown resistor 11, assumed to be 21 ohms, resistor 21 is retained within bridge 14. Such retention of known resistor 21 is accomplished by the cooperative action of the phase-sensitive null detector 25 and stepping switch 19.

Considering now the operation of the phase-sensitive null detector in detail, it is supplied through bridge 14 by a source of alternating current 15, FIG. 1. The detector is also supplied by a source of alternating current 85, FIG. 2. Both sources of alternating current 15 and 85 are either in phase with one another or harmonically related to one another. Due to the grounded and adjustable center tap of transformer 86 through potential divider 87, the voltage across terminal contactors 13 and 22 differs 180° from that appearing at terminal contactors 12 and 13. Also, due to the grounded and adjustable center tap of transformer 88 through potential divider 89, the voltage across terminals 91 and 92 differs 180° from that appearing at terminals 92 and 93. Moreover when bridge 14 is in a balanced condition, the voltage across terminal contactors 12 and 13 is in phase with that appearing at terminals 92 and 93, and the voltage appearing across terminal contactors 22 and 13, which differs 180° from that appearing at terminal contactors 12 and 13, is in phase with that appearing across terminals 91 and 92. As a preliminary adjustment bridge 14 is balanced by the insertion of known equal resistors in all branches thereof. While bridge 14 is balanced, potential dividers 87 (FIG. 1) and 89 (FIG. 2) and D.C. balance network 94 are adjusted so that armature 95 of bi-polar relays 96 and 97 is in its neutral position, that is, neither engaging contacts 98 nor 99.

While sweep arms 37 and 38 are in engagement with contactors 2a and 2b, respectively, and known resistor 21 of 16 ohms is connected between terminal contactors 13 and 22 of bridge 14, the voltage waveform appearing across terminal contactors 22 and 13 predominates the voltage waveform appearing across terminal contactors 12 and 13, that is, the voltage across terminal contactors 22 and 13 leads that appearing across terminal contactors 12 and 13. Both the leading voltage across terminal contactors 22 and 13 and the lagging voltage across terminal contactors 12 and 13 are directed by conductors 74 and 83 to grid 101, FIG. 2, of a conventional voltage amplifying tube 102. This circuit is completed by ground 103, FIG. 1, and ground 104, FIG. 2. From tube 102 both voltages are directed to subsequent conventional voltage amplifying tubes 105 and 106. From plate 107 of tube 106 these voltages are directed to grid 111 of phase comparing tube 112 and to grid 115 of phase comparing tube 116. From FIG. 2 it is obvious that grids 111 and 115 are connected in parallel. Such voltages at grids 111 and 115 produce a plate current in tubes 112 and 116. This plate current is depicted by current waveform c, Condition 2, FIG. 4. Current waveform c, Condition 2, lags current waveform c, Condition 1, representing a balanced bridge 14, since the now connected known resistor 21 of 16 ohms is smaller in value than unknown resistor 11, assumed to be 21 ohms.

While tubes 112 and 116 are conducting to produce the plate current waveform c, Condition 2, due to now connected known resistor 21 being smaller in value than unknown resistor 11, tubes 117 and 118 sequentially and alternately conduct and non-conduct due to the alternating current source 85 which is connected to grids 119 and 120, respectively, of tubes 117 and 118. Since the potential divider 89 has been previously adjusted for the balanced condition of bridge 14, equal amounts of voltage from source 85 alternately and sequentially appear at grids 119 and 120 to produce plate currents in tubes 117 and 118, respectively, equal in magnitude but out of phase by 180°, depicted by current waveforms a and b, respectively, Condition 2, FIG. 4.

The plate currents of tubes 118 and 116 represented by current waveforms a and c, Condition 2, FIG. 4, combine to produce a current, represented by current waveform d, Condition 2, in resistor 180. Also plate currents of tubes 117 and 112, represented by current waveforms b and c, Condition 2, FIG. 4, combine to produce a current, represented by current waveform e, Condition 2, in resistor 190. From Condition 2, FIG. 4, it is obvious that the current in resistor 180 is much larger than that in resistor 190. Such larger plate current in resistor 190 produces a considerably larger voltage across resistor 190 than that appearing across resistor 180. The voltage across resistor 190 is filtered by resistor 121 in conjunction with capacitor 122 to produce a positive D.C. voltage at grid 127 of relay driving tube 128 rendering tube 128 conductive.

Further, the voltage across resistor 180, which is considerably smaller than that across resistor 190, is filtered by resistor 125 in conjunction with capacitor 126 to produce a positive D.C. voltage at grid 123 of relay driving tube 124. But this D.C. voltage at grid 123 is considerably smaller than that at grid 127. Accordingly, the plate current of tube 128 is considerably larger than that of tube 124. Relay 97, which is connected within the plate circuit of tube 128, is therefore subjected to a much larger current than is relay 96, which is connected within the plate circuit of tube 124. Thus, armature 95 is moved leftwardly to engage contact 99 and prevent ground 129 from being applied to conductor 131.

Since conductor 131 has no ground thereon when sweep arm 38 engages contactor 2b, no ground will be applied through conductors 132, 133, 44, 45 to relay 46. Hence, relay 46 will continue to be energized through the holding circuit from ground to relay 46, conductor 45, conductor 75, closed contacts 49, conductor 76, closed switch 16 to source to direct current 18. Because of the continued energization of relay 46, resistor 21 will remain connected across terminal contactors 13 and 22 of bridge 14 and the bi-stable device 23 will remain closed indicating a 1 in the binary number system, which is applied to computer 24 over conductor 52.

From contactors 2a and 2b sweep arms 37 and 38 simultaneously move to contactors 3a and 3b. In the same manner that known resistor 21 was connected across terminal contactors 13 and 22, known resistor 26 is connected in series with known resistor 21 and such series combination of resistor 21 and 26 is connected across terminal contactors 22 and 13 of bridge 14. More particularly, when sweep arms 37 and 38 simultaneously engage contactors 3a and 3b, the source of direct current 18 is connected through closed switch 16, conductor 42, sweep arm 37, now engaged contactor 3a, conductors 134, 135, 136, and relay 54 to ground. Completion of this circuit energizes relay 54 to move downwardly contacts 56 and 53 and close contacts 27 and 137. Upon downward movement of contacts 56 and 53, known resistor 26 is connected in series with retained known resistor 21, and such series combination is connected within bridge 14. This circuit is traced from: terminal contactor 22, conductor 51, downwardly moved contacts 48 of operated relay 46, resistor 21, downwardly moved contacts 47 of operated relay 46, conductor 52, now downwardly moved contacts 53 of now operated relay 54, resistor 26 now downwardly moved contacts 56 of now operated relay 54, conductor 57, contacts 58 of unoperated relay 59, strap 60, contacts 61 of unoperated relay 59, conductor 62, contacts 63 of unoperated relay 64, strap 65, contacts 66 of unoperated relay 64, conductor 67, contacts 68 of unoperated relay 69, strap 71, contacts 72 of unoperated relay 69, and conductors 73 and 74 to terminal contactor 13.

Upon operation of relay 54, a holding circuit similar to that of relay 46 is established from ground through relay 54, conductors 136 and 138, now closed contacts 137, conductors 139 and 76, closed switch 16 to the source of direct current 18. This holding circuit keeps relay 54 energized or operated until it is subsequently short circuited.

Contacts 27 of relay 54 comprise a bi-stable device similar to contacts 23 of relay 46. Upon energization of relay 54 the condition of the bi-stable device, contacts 27, changes from open to closed, that is, from 0 to 1 in the binary number system.

After resistor 26 has been connected in series with resistor 21 and within bridge 14, sweep arms 37 and 38 simultaneously move from contactors 3a and 3b to contactors 4a and 4b where a comparison or checking operation is performed similar to that which was performed when sweep arms 37 and 38 engaged contactors 2a and 2b. The combined series resistance value of retained known resistor 21 and now connected known resistor 26 is compared to that of unknown resistor 11. Known resistor 21, is previously mentioned, is equal to $2^4$ or 16 ohms and is represented in the binary number system 1 0 0 0 0. Known resistor 26 is equal to $2^3$ or 8 ohms and is represented in the binary number system as $$0\times2^4+1\times2^3+0\times2^2+0\times2^1+0\times2^0 \text{ or } 0\ 1\ 0\ 0\ 0$$

The comparison of the series combination of known resistors 21 and 26 to unknown resistor 11 is accomplished by the cooperative action of the phase-sensitive null detector 25 and stepping switch 19. Since known resistor 21 of 16 ohms plus known resistor 26 of 8 ohms is equal to 24 ohms, such series combination of resistors is larger in resistance value than resistor 11 assumed to be 21 ohms. Therefore, resistor 26 is removed by the phase-sensitive null detector 25 from bridge 14. More particularly, since the series combination of known resistors 21 and 26 of a total of 24 ohms is larger in value than unknown resistor 11, assumed to be 21 ohms, the voltage waveform appearing across terminal contactors 12 and 13 predominates that appearing across terminal contactors 22 and 13, i.e., the voltage across terminal contactors 12 and 13 leads that appearing across terminal contactors 22 and 13. Both the leading and the lagging voltages are amplified and directed to grid 111 of tube 112 and grid 115 of tube 116. Such voltages at grids 111 and 115 produce a plate current in tubes 112 and 116. This plate current is depicted by current waveform c, Condition 3, FIG. 4. Current waveform c, Condition 3, leads current waveform c, Condition 1, representing a balanced bridge 14, since now connected known resistors 21 and 26 of a total of 24 ohms is larger in value than unknown resistor 11, assumed to be 21 ohms. Consequently, the voltage across resistor 190 will be considerably larger than that across resistor 180 and the D.C. voltage appearing at grid 123 will similarly be considerably larger than that appearing at grid 127. Such larger voltage at grid 123 produces a much larger plate current in tube 124 than in tube 128 to thereby move armature 95 rightwardly to engage contact 98 and apply ground 129 to conductor 136 (left top corner of FIG. 1) to deenergize relay 54 by short-circuiting it. This circuit is traced from ground 129, armature 95, now engaged contact 98, conductor 131, sweep arm 38, now engaged contactor 4b, conductors 141, 134, 135, and 136, and relay 54 to ground. The deenergization of relays 54 moves contacts 56 and 53 upwardly to remove known resistor 26 from bridge 14. Also, previously closed contacts 27 and 137 are opened to return them to their initial unoperated condition. Upon the opening of contacts 27, a change from 1 to 0 in the binary number system is effected. And upon the opening of contacts 137, the holding circuit for relay 54 is broken.

Next sweep arms 37 and 38 simultaneously move from contactors 4a and 4b to contactors 5a and 5b. In the same manner that known resistors 21 and 26 were connected in series across terminal contactors 13 and 22, known resistor 28 is connected in series with known resistor 21 and such series combination of known resistors 21 and 28 is connected across terminal contactors 22 and 13 of bridge 14. Specifically, upon sweep arms 37 and 38, simultaneously engaging contactors 5a and 5b, the source of direct current 18 is connected through closed switch 16, conductor 42, sweep arm 37, now engaged contactor 5a, conductors 145, 146, and 147, and relay 59 to ground. Completion of this circuit energizes relay 59 to move downwardly contacts 61 and 58 and close contacts 32 and 148. Upon downward movement of contacts 61 and 58, known resistor 28 is connected in series with retained known resistor 21 and such series combination is connected within bridge 14. The circuit is traced from: terminal contactor 22, conductor 51, downwardly moved contacts 48 of operated relay 46, resistor 21, downwardly moved contacts 47 of operated relay 46, conductor 52, contacts 53 of unoperated relay 54, strap 55, contacts 56 of unoperated relay 59, conductor 57, now downwardly moved contacts 58 of now operated relay 59, resistor 28, now downwardly moved contacts 61 of now operated relay 59, conductor 62, contacts 63 of unoperated relay 64, strap 65, contacts 66 of unoperated relay 64, conductor 67, contacts 68 of unoperated relay 69, strap 71, contacts 72 of unoperated relay 69, and conductors 73 and 74 to terminal contactor 13.

Upon operation of relay 59 a holding circuit similar to that of relay 46 is established from ground through relay 59, conductors 147 and 149, now closed contacts 148, conductors 151 and 76, and closed switch 16 to the source of direct current 18. This holding circuit keeps relay 59 in an energized or operated state until it is subsequently short circuited.

Contacts 32 of relay 59 comprise a bi-stable device similar to that of relay 46. Upon energization of relay 59, the condition of bi-stable device, contacts 32, changes from open to close, that is, from 0 to 1 in the binary number system. Such change is impressed on the input circuit of the computer 24.

After known resistor 28 has been connected in series with known resistor 21 and they have been serially connected within bridge 14, sweep arms 37 and 38 simultaneously move from contactors 5a and 5b to contactors 6a and 6b where a comparison or checking operation is performed similar to those previously performed. The combined resistance value of retained known resistor 21 and now serially connected known resistor 28 is compared to that of resistor 11. As previously mentioned known resistor 21 is equal to $2^4$ or 16 ohms and is represented in a binary number system as 1 0 0 0 0. Known resistor 28 is equal to $2^2$ or 4 ohms and is represented in the binary number system as $0\times2^4+0\times2^3+1\times2^2+0\times2^1+0\times2^0$ or 0 0 1 0 0. Since known resistor 21 of 16 ohms plus known resistor 28 of 4 ohms is equal to 20 ohms ( 1 0 1 0 0 in the binary system), such series combination of known resistors is smaller in resistance value than unknown resistor 11, assumed to be 21 ohms. Therefore resistor 28 is retained within bridge 14 by the phase-sensitive null detector 25. More particularly, since the series combination of known resistors 21 and 28, a total of 20 ohms, is smaller in value than unknown resistor 11, assumed to be 21 ohms, the voltage across terminal contactors 12 and 13 leads that appearing across terminal contactors 22 and 13. Thus, Condition 2, FIG. 4 obtains and the voltage across resistor 180 will be larger than that across resistor 190. Also, the positive D.C. voltage appearing at grid 127 of tube 128 will similarly be larger than that appearing at grid 123 of tube 124. Such larger voltage at grid 127 produces a much larger plate current in tube 128, thereby moving armature 95 leftwardly to engage contact 99 and prevent ground 129 from short-circuiting relay 59. Hence, known resistor 28 is retained in series with known resistor 21 and within bridge 14 in the same manner that known resistor 21 was retained within bridge 14. Moreover, contacts 32 of relay 59 are maintained closed to indicate a 1 in the binary number system, which is applied to the input circuit leading to the computer 24.

Next, sweep arms 37 and 38 simultaneously move from contactors 6a and 6b to contactors 7a and 7b. In the same manner that known resistors 21 and 28 were connected across terminal contactors 12 and 13, known resistor 29 is similarly connected in series of known resistors 21 and 28, and such series combination of known resistors 21, 28, and 29 are connected across terminal contactors 12 and 13 of bridge 14. Similar to the manner in which the source of direct current 18 was connected through sweep arm 37 and contactor 1a to energize relay 46, the source of direct current 18 is connected through closed switch 16, conductor 42, sweep arm 37, contactor 7a, conductors 155, 156, 157, and 158 to energize relay 64. Upon energization of relay 64, contacts 66 and 63 are moved downwardly and contacts 33 and 159 are closed. Downward movement of contacts 66 and 63 connects known resistor 29 in series with retained known resistors 21 and 28. Such series combination is connected within bridge 14. This circuit is traced from: terminal contactor 22, conductor 51, downwardly moved contacts 48 of operated relay 46, resistor 21, downwardly moved contacts 47 of operated relay 46, conductor 52, contacts 53 of unoperated relay 54, strap 55, contacts 56 of unoperated relay 54, conductor 57, downwardly moved contacts 58 of operated relay 59, resistor 28, downwardly moved contacts 61 of operated relay 59, conductor 62, now downwardly moved contacts 63 of now operated relay 64, resistor 29, contacts 66 of now downwardly moved contacts of now operated relay 64, conductor 67, contacts 68 of unoperated relay 69, strap 71, contacts 72 of unoperated relay 69, and conductors 73 and 74 to terminal contactor 13.

Moreover, upon operation of relay 64, a holding circuit similar to that of relay 46 is established from ground through relay 64, conductors 158 and 161, now closed contacts 159, conductors 162 and 76, and closed switch 16 to the source of direct current 18. This holding circuit keeps relay 64 energized or operated until it is subsequently short-circuited.

Contacts 33 of relay 64 comprise a bi-stable device similar to that of relay 46. Upon energization of relay 64 the condition of the bi-stable device, contacts 33, changes from open to closed, that is, from 0 to 1 in the binary number system. Such change is applied to the input circuit of the computer 24.

As previously mentioned known resistor 21 is equal to $2^4$ or 16 ohms and known resistor 28 is equal to $2^2$ or 4 ohms. Both of these resistors have been retained within bridge 14. Known resistor 29 is equal to $2^1$ or 2 ohms and is represented in the binary number system as $0 \times 2^4 + 0 \times 2^3 + 0 \times 2^2 + 1 \times 2^1 + 0 \times 2^0$ or 0 0 0 1 0. Before known resistor 29 was connected in series with known resistors 21 and 28, and within bridge 14, there was a total of 20 ohms between terminal contactors 22 and 13 of bridge 14.

After known resistor 29 has been connected in series with known resistors 21 and 28 and within bridge 14, sweep arms 37 and 38 simultaneously move from contactors 7a and 7b to contactors 8a and 8b where a comparison or checking operation is performed. Since such comparison or checking operation is similar to that which was performed when sweep arms 37 and 38 simultaneously engaged contactors 2a and 2b, 4a and 4b, 6a and 6b, the detailed operation thereof will not be delved into. Suffice it to say that since the combined resistance value of retained known resistors 21 and 28 and now serially connected known resistor 29 is larger than that of unknown resistor 11, assumed to be 21 ohms, resistor 29 is disconnected from bridge 14 by the cooperative action of the phase-sensitive null detector 25 and stepping switch 19. Such disconnection is accomplished in the same manner that resistor 26 was disconnected from bridge 14, as resistor 26 in series with resistor 21 was larger than unknown resistor 11. Because known resistor 29 is disconnected from bridge 14, the bi-stable device, contacts 33, are returned to their open position as represented by 0 in the binary number system.

Next sweep arms 37 and 38 simultaneously move from contactors 8a and 8b to contactors 9a and 9b. In the same manner that known resistor 21 was connected across terminal contactors 13 and 22, known resistor 31 is connected in series with retained known resistors 21 and 28, and such series combination of known resistors 21 and 28 along with now serially connected known resistor 31 are all connected across terminal contactors 22 and 13 of bridge 14. More particularly, when sweep arms 37 and 38 simultaneously engage contactors 9a and 9b, the source of direct current 18 is connected to relay 69 in the same manner that it was previously connected to relay 46 to place resistor 21 within bridge 14. Since the manner in which resistor 31 is connected within bridge 14 is very similar to the manner in which resistor 21 was connected within bridge 14 and is obvious from the circuit drawings, FIGS. 1 and 2, a detailed explanation thereof will not be set forth.

Also, a holding circuit including contacts 164 similar to that of relay 46 is established for relay 69. This holding circuit keeps relay 69 energized or operated until it is subsequently short-circuited.

Similar to the bi-stable device, contacts 49, associated with relay 46, another bi-stable device, contacts 34, is associated with relay 69. Upon energization of relay 69 the condition of the bi-stable device, contacts 34, changes from open to close, that is, from 0 to 1 in the binary number system. Such change is sensed by computer 24.

As previously mentioned known resistor 21 is equal to $2^4$ or 16 ohms and known resistor 28 is equal to $2^2$ or 4 ohms. Both of these known resistors have been retained within bridge 14. Known resistor 31 is equal to $2^0$ or 1 ohm and is represented in the binary number system as $0 \times 2^4 + 0 \times 2^3 + 0 \times 2^2 + 0 \times 2^1 + 1 \times 2^0$ or 0 0 0 0 1. Before known resistor 29 was connected in series with known resistors 21 and 28 and within bridge 14, there was a total of 20 ohms between terminal contactors 22 and 13 of bridge 14.

After known resistor 31 is connected in series with known resistors 21 and 28 and within bridge 14, sweep arms 37 and 38 simultaneously move from contactors 9a and 9b to contactors 10a and 10b where a comparison or checking operation is performed and computer 24 is conditioned to "read" the state of bridge 14. This comparison or checking operation is similar to that which was performed when sweep arms 37 and 38 simultaneously engaged contactors 2a and 2b, 4a and 4b, 6a and 6b, and 8a and 8b. However, with known resistor 31 of 1 ohm connected in series with known resistor 21 of 16 ohms and known resistor 28 of 4 ohms, there is a total of 21 ohms (1 0 1 0 1 in the binary number system) between terminal contactors 13 and 22. Also unknown resistor 11, assumed to be 21 ohms, has been previously connected between terminal contactors 12 and 13. Since the known resistors 21, 28, and 31 connected between terminal contactors 13 and 22 exactly equals in resistance value unknown resistor 11 connected between terminal contactors 13 and 22, bridge 14 obtains a balanced condition which is sensed by the phase-sensitive null detector 25. With such balanced condition, voltage across terminal contactors 12 and 13 is exactly in phase with that across terminal contactors 22 and 13. Thus, Condition 1, FIG. 4, exists and equal voltages appear at grid 127 of tube 128 and grid 123 of tube 124. Therefore, relays 96 and 97 have equal plate currents directed thereto. As a result of such equal plate currents, armature 95 maintains its neutral position so as not to engage either contacts 98 or 99. Thus, ground 129 will not be applied to relay 69 to short it out and such relay 69 remains operated or energized through the holding circuit including contacts 164.

Moreover, while sweep arms 37 and 38 simultaneously engage, respectively, contactors 10a and 10b, computer 24 is conditioned to "read" the state of bi-stable devices 23, 27, 32, 33, and 34 over computer input leads 108. Such conditioning of computer 24 is accomplished by the application of the source of direct current 18 through a conventional time-delay circuit 109 to computer 24. The time-delay circuit 109 makes certain that the comparison or checking operation is completed before the computer 24 is conditioned to "read" the bi-stable devices 23, 27, 32, 33, and 34, and the value of the time-delay circuit 109 is accordingly adjusted. The conditioning circuit of the computer 24 is traced from the source of direct current 18, conductor 42, sweep arm 37, contactor 10a, conductor 110, time-delay circuit 109, and conductor 140 to computer 24.

To summarize, when sweep arms 37 and 38 simultaneously engage contactors 10a and 10b, and unknown resistor 11 is assumed to be equal to 21 ohms, the following conditions exist:

| Relays (Reference numerals) | 46 | 54 | 59 | 64 | 69 | |
|---|---|---|---|---|---|---|
| Condition of Relays | Operated. | Unoperated. | Operated. | Unoperated. | Operated. | |
| Resistors (Reference Numerals) | 21 | 26 | 28 | 29 | 31 | |
| Resistors (Values) | $2^4$ or 16 ohms. | $2^3$ or 8 ohms. | $2^2$ or 4 ohms. | $2^1$ or 2 ohms. | $2^0$ or 1 ohm. | |
| Resistors Connected within bridge 14 (Reference Numerals). | 21 | | 28 | | 31 | |
| Values of Connected Resistors in the decimal number system. | 16 ohms | | 4 ohms | | 1 ohm | 21 ohms total. |
| Binary equivalent of unknown resistor 11 | 1 | 0 | 1 | 0 | 1 | |

From the above summary, it is apparent that the condition of the bi-stable devices 23, 27, 32, 33, and 34 in the binary number system is 1 0 1 0 1 0 (last line of above summary). Further, such binary equivalent in the decimal system is represented as $$1\times 2^4 + 0\times 2^3 + 1\times 2^2 + 0\times 2^1 + 1\times 2^0 = 16+0+4+0+1=21$$

ohms.

When sweep arms 37 and 38 simultaneously engage contactors 10a and 10b and the comparison or checking operation for resistor 34 is completed, computer 24 "reads" the bi-stable devices, that is, contacts 23, 27, 32, 33, and 34. By using computer 24 to "read" such bi-stable devices only when sweep arms 37 and 38 engage contactors 10a and 10b, a savings in tie-up time of computer 24 is achieved. In other words, when sweep arms 37 and 38 engage all the other contactors other than 10a and 10b, computer 24 may be utilized elsewhere.

From terminal contactors 10a and 10b sweep arms 37 and 38 simultaneously move to contactors 11a and 11b, respectively. When sweep arms 37 and 38 so engage contactors 11a and 11b, relays 46, 54, 59, 64, and 69 are reset or shorted out to make the measuring circuit available for another measuring cycle. More particularly, when sweep arm 37 engages contactor 11a, the source of direct current 18 is connected through closed switch 16, conductor 42, sweep arm 37, now engaged contactor 11a, conductor 166 to relay 35 to energize or operate it. Energization of relay 35 closes a plurality of contacts designated generally by the numeral 167, to short-circuit relays 46, 54, 59, 64, and 69, thereby releasing any relays that have been maintained, energized, or operated by the associated holding circuits. Such short-circuiting resets relays 46, 54, 59, 64, and 69 to condition them for another measuring cycle.

From contactors 11a and 11b, sweep arms 37 and 38 simultaneously move to contactors 12a and 12b to energize relay 36. This energizing circuit is traced from the source of direct current 18, closed switch 16, conductor 42, sweep arm 37, now engaged contactor 12a, conductor 181, and relay 36 to ground. Energization of relay 36 opens contacts 82 to open the circuit of operating coil 77 of stepping switch 19. Such opening of this circuit prevents further movement of stepping switch 19. Now the measuring circuit is conditioned for another measuring cycle. To measure another unknown resistor, it is inserted either manually or automatically between terminal contactors 12 and 13, and sweep arms 37 and 38 of stepping switch 19 are moved simultaneously either manually or automatically from contactors 12a and 12b to contactors 1a and 1b.

It is apparent that known resistors 21, 26, 28, 29, and 31 are of succeedingly smaller resistance values and that the values descend in the order of a mathematical geometric progression having a common ratio of ½. That is, resistor 21 of 16 ohms when multiplied by ½ equals the resistance value of resistor 26 of 8 ohms and so forth. It is to be understood that the resistance values of the known resistors may vary in accordance with other mathematical series or progressions whether they be arithmetic or geometric, and that the particular known resistors described above are only representative. Further, in the above description only five known resistors were used for describing the present invention. However, a greater or a lesser number of known resistors could have been used depending on the desired range of the measuring circuit. Also, the above-described measuring circuit is readily adaptable to measure other electrical components such as capacitors, inductors, and the like.

It is to be understood that relays 96 and 97 may be only one relay unit having two windings and a balanced armature mounted therebetween.

It is to be further understood that the above-described arrangement of circuits and construction of component devices are simply illustrative of an application of the principles of the invention and many other modifications may be made without departing from the invention.

What is claimed is:

In a system for measuring the resistance value of an unknown resistor;
  bridge circuit means having the unknown resistor to be measured in one branch thereof;
  a series of resistors each having a succeedingly smaller and binary related known resistance value;
  a plurality of binary indicating normally open contacts individual to each resistor;
  relay means individual to each resistor for closing said contacts and for connecting the known resistors into a balancing arm of said bridge circuit means either to establish a first condition of balance wherein the resistance value of the sum of the known resistors connected into the bridge circuit means is equal to or smaller than the resistance value of the unknown resistor, or to establish a second condition of balance wherein the resistance value of the sum of the known resistors connected into the bridge circuit means is larger than the resistance value of the unknown resistor;
  holding circuit means for, and operable by, each relay means;
  a phase sensitive null detector including a pair of electronic tubes responsive to said conditions of balance;
  stepping switch means,
    having a first plurality of positions contacted by a first sweep arm for successively closing the binary indicating contacts and for successively operating each relay means to connect successively each of the known resistors into the bridge circuit means and to operate said holding circuit means, and having a second plurality of alternate positions contacted by a second sweep arm to connect successively the output of the bridge circuit means to the detector for operating the first of said tubes after each known resistor is connected within the bridge circuit means upon said bridge circuit means reaching the first condition of balance, and for operating the second of said tubes after each known resistor is connected within the bridge circuit means upon said bridge circuit means reaching the second condition of balance;

means, operated by said first tube, for releasing said holding circuit means, for disconnecting each known resistor from the bridge circuit means and for opening the binary indicating contacts;

means, operated by said second tube, for preventing the opening of the binary indicating contacts and the disconnection of each connected known resistor from the bridge circuit means by not releasing said holding circuit means;

means, operated by the first sweep arm contacting the next to the last position of the first plurality of positions of said stepping switch means, for resetting said relay means by shunting said relay means; and means, operated by the first sweep arm contacting the last position of the first plurality of positions of said stepping switch means, for deenergizing said stepping switch, whereby the condition of the binary indicating contacts represents the resistance value of the unknown resistor to be measured in the binary number system.

References Cited by the Examiner
UNITED STATES PATENTS 2,776,405   1/57   Moore _____ 324—73
2,843,839   7/58   Cunningham _____ 340—149 X
2,901,685   8/59   Alder _____ 324—57

WALTER L. CARLSON, *Primary Examiner.*

IRVING L. SRAGOW, *Examiner.*